Jan. 20, 1942.  A. PERSON  2,270,338
EYEGLASS CONSTRUCTION
Filed April 22, 1940
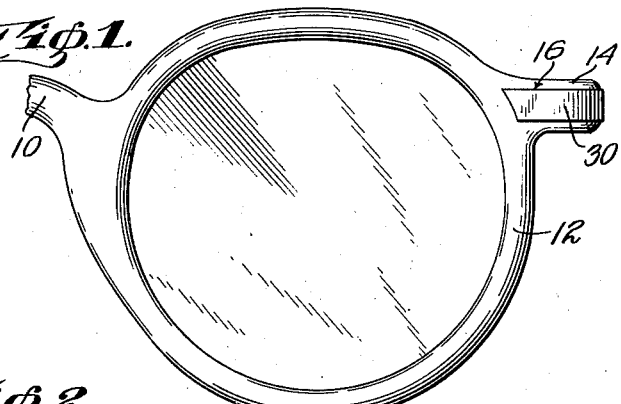
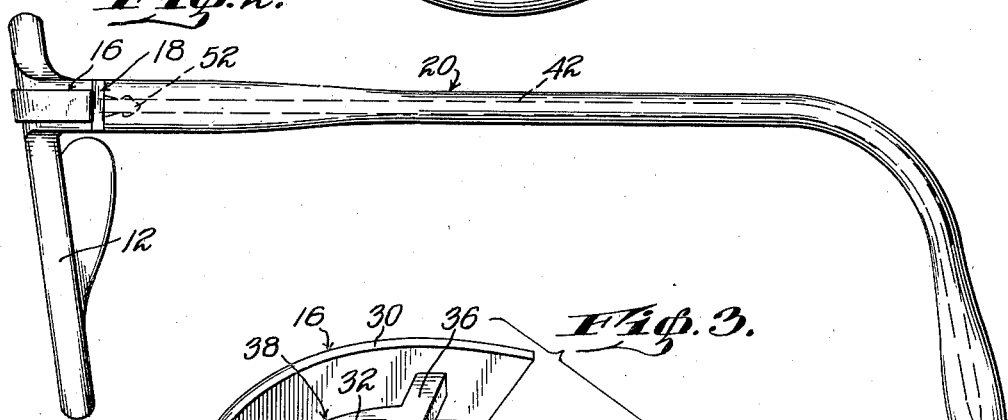
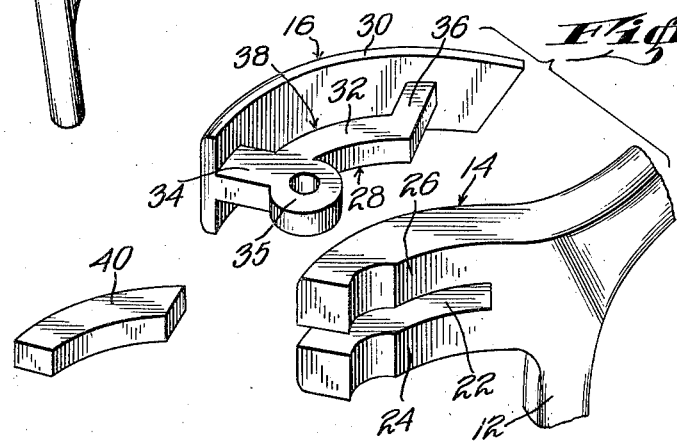
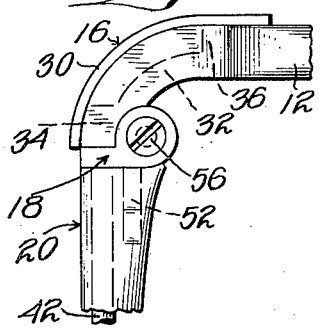
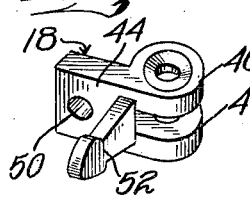
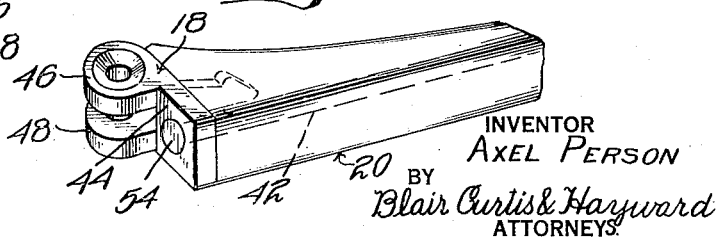
INVENTOR
AXEL PERSON
BY
Blair Curtis & Hayward
ATTORNEYS Patented Jan. 20, 1942

2,270,338

UNITED STATES PATENT OFFICE 2,270,338

EYEGLASS CONSTRUCTION

Axel Person, Attleboro, Mass., assignor to Bay State Optical Company, Attleboro, Mass., a corporation of Maine Application April 22, 1940, Serial No. 330,887

9 Claims. (Cl. 88—53)

This invention relates to eyeglass construction and more particularly to the parts comprising the connection between a temple and a non-metallic frame.

One of the objects of this invention is to provide a simple and thoroughly practical eyeglass construction. Another object is to provide a struction of the above character which may be neat and attractive in appearance. Another object is to provide an eyeglass construction of the above character which may be easily manufactured with a minimum amount of labor and from inexpensive materials. A further object is to provide an eyeglass construction of the above character which will be sturdy and durable under the strain of extended use. A still further object is to provide an eyeglass construction of the above character wherein the metallic parts are reliably secured to the non-metallic frame. Still another object is to provide an eyeglass construction of the above character which may be easily and quickly assembled. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawing in which is shown one of the various possible embodiments of my invention, Figure 1 is a front elevation of a portion of an eyeglass frame having my endpiece construction applied thereto;

Figure 2 is a side elevation of an eyeglass frame having the features of my invention embodied therein;

Figure 3 is an exploded perspective view on an enlarged scale of the endpiece of the frame shown in Figures 1 and 2;

Figure 4 is a top plan view taken through a portion of the frame shown in Figures 1 and 2;

Figure 5 is a perspective view on an enlarged scale of a metallic fitting used in the frame; and Figure 6 is a perspective view on an enlarged scale showing a portion of the temple used in the frame shown in Figures 1 and 2.

As conducive to a clearer understanding of certain features of this invention, it might here be pointed out that in making eyeglass frames from a non-metallic material, such as zylonite or the like, considerable difficulty has been experienced in securely connecting metallic fittings thereto. This arises from the fact that it is difficult to obtain a joinder between the fittings and the frame which will not loosen after continued usage, such loosening being difficult and sometimes impossible to repair. Further difficulty has been experienced in making a metallic fitting for a non-metallic frame which is neat and attractive in appearance, as non-metallic frames are usually partially or completely transparent so that the parts comprising the fittings can be easily seen. As the majority of fittings are bulky and have projections formed thereon for connecting them to a non-metallic frame, such fittings materially detract from the appearance of non-metallic frames. Another object of this invention is to provide a construction wherein the above difficulties, as well as many others, are effectively overcome.

It might here be noted that reference hereinafter to an "outward" direction signifies a direction to the left or right of the bridge of an eyeglass frame in the direction of the temples, while the term "inward" denotes a direction toward the bridge from one of the temples. A "rearward" direction refers to a direction toward the face of the wearer, whereas the term "forward" denotes the opposite direction. An "upward" direction refers to a direction upwardly from the face of the wearer, while a "downward" direction is opposite thereto.

Referring now to Figure 1, a portion of a non-metallic eyeglass frame is shown which includes a bridge 10, rim 12, and an endpiece, generally indicated at 14. Endpiece 14 is curved rearwardly (Figures 2 and 4) and is hingedly connected by metallic fittings, generally indicated at 16 and 18, to a temple, generally indicated at 20 (Figure 2).

As best shown in Figure 3, endpiece 14 is provided with a slot 22 which extends therethrough substantially in a horizontal plane with respect to the normal position of the frame when worn. This slot separates endpiece 14 into two horizontally disposed tongues 24 and 26, and is adapted to receive a portion of fitting 16.

Metallic fitting 16 (Figure 3) includes a tongue portion 28 and a curved cover plate 30, the former of which comprises a body portion 32, an ear 35, and a pair of legs 34 and 36. Tongue portion 28 is of substantially the same thickness as the width of slot 22, and the ends of legs 34 and 36 are secured to cover plate 30 at substantially its center line. This forms an opening 38 between legs 34 and 36, cover plate 30, and body portion 32, which is adapted to receive an insert 40 (Figure 3). This insert is preferably made of plastic material and has substantially the same dimensions as opening 38.

To connect fitting 16 to endpiece 14, insert 40 is placed in opening 38 and the exposed surfaces of the insert, the inner surface of cover plate 30 and tongue portion 28 are given a coating of a cellulose lacquer. When this has set, the above surfaces, the sides of slot 22, and the front surface of endpiece 14 are given a coat of a cellulose solvent, such as ethyl acetate. When this solvent has reduced these surfaces to a fusible state, tongue portion 28 is inserted in slot 22.

When fitting 16 is properly positioned with cover plate 30 abutting against the front surface of endpiece 14, tongues 24 and 26 are pressed together against insert 40 and tongue portion 28. As the solvent evaporates, the abutting surfaces fuse together, making insert 40 an integral part of the non-metallic endpiece, and forming a strong bond between the surfaces of fitting 16 contacting the non-metallic frame.

Usually, non-metallic frames are cut in the form of blanks from a flat sheet of plastic material, and rearwardly curved endpieces are formed thereon by bending a portion of the blank rearwardly. Accordingly, the natural tendency of rearwardly curved endpieces formed in this manner is to straighten or return to the plane from which they were bent.

When fitting 16 is secured in position, cover plate 30, in addition to strengthening the endpiece, holds it to the curve it had at the time when the fitting was secured thereto. Thus, plate 30 supports the endpiece throughout its length, effectively preventing it from following its natural tendency to straighten. Thus, a connection between a non-metallic frame and a metallic fitting has been disclosed which is neat and attractive in appearance, while, at the same time, it is strong and durable and well adapted to stand the strain of extended use.

Referring now to Figure 2, temple 20 is made of non-metallic material, such as zylonite, and has a metallic rod 42 extending through its center. Temple fitting 18 (Figure 5) is secured to the outer end of rod 42, forming the connecting link between endpiece fitting 16 and rod 42. It includes a cover portion 44 having a pair of ears 46 and 48 formed on its inner edge, a hole 50 of substantially the same diameter as rod 42, and a pin 52, which is preferably pointed and may be secured to cover portion 44 in any suitable manner, such as by soldering.

To connect temple fitting 18 to the end of temple 20, which is preferably slightly enlarged, as seen in Figures 4 and 6, to accommodate the parts of fitting 18, the end of the temple is heated or treated by a suitable solvent, which softens the plastic material. Next, pin 52 is forced into the softened end of the temple, the end of the rod 42 entering hole 50. When the plastic material cools, the outer end 54 (Figure 6) of rod 42 is headed over. To connect metallic fittings 16 and 18, ear 35 of fitting 16 is placed between the ears 46 and 48 of fitting 18, and they are pivotally secured in this relationship by a screw 56 (Figure 4).

Thus the temple fitting is attached to the temple both by its connection to rod 42 and by pin 52. Pin 52, in addition to securing the fitting to the end of the temple, serves the purpose of preventing rotation of the fitting about its point of connection to rod 42. Accordingly, a strong and durable temple construction of pleasing appearance has been disclosed which is well adapted to absorb the strains of extended use.

It will thus be seen that I have provided a thoroughly practical and efficient construction in which the several objects hereinabove referred to, as well as many others, are successfully accomplished.

As many possible embodiments may be made of the above invention, and as many changes might be made in the embodiment above set forth, it is to be understood that all matter hereinbefore set forth or shown in the accompanying drawing, is to be interpreted as illustrative and not in a limiting sense.

I claim:

1. In eyeglass construction, in combination, an eyeglass frame formed from material plastic in character, a curved endpiece, a flat metallic member embedded in said endpiece having an opening formed therein, a cover member secured to said flat metallic member, said cover member lying in a plane substantially vertical with respect to the plane in which said flat metallic member lies and contacting the front surface of said curved endpiece, said plastic material extending through said opening and securing said members to said frame, a temple fitting, means hingedly connecting said temple fitting to said flat metallic member, a temple, a rod extending through the center of said temple, and means connecting said temple fitting to said rod.

2. In eyeglass construction, in combination, an eyeglass frame formed from material plastic in character, a metallic member embedded in said frame having an opening of substantial size formed therein, said material extending through said opening, a cover member secured to said metallic member and extending in a plane substantially vertical to the plane of said metallic member, said cover member being positioned externally of said non-metallic frame and contacting its front surface, and a temple secured to one of said members.

3. In eyeglass construction, in combination, an eyeglass frame formed from material plastic in character, a flat metallic member embedded in said frame in substantially a horizontal plane with respect to the normal position of the frame when worn, a cover member connected to said metallic member and extending upwardly and downwardly therefrom along the front surface of said frame, means forming an opening of substantial size between said metallic member and said cover member, said material extending through said opening, and a temple connected to one of said members.

4. In eyeglass construction, in combination, a non-metallic eyeglass frame, a rearwardly curved endpiece formed on said frame, a slot formed in said endpiece in substantially a horizontal plane with respect to the normal position of the frame when worn, a metallic fitting including tongue and cover portions, said cover portion being substantially vertical to the plane in which said tongue portion is positioned and following the front surface of said curved endpiece, said tongue portion being positioned in said slot, and means forming an opening between said cover portion and said tongue portion, a portion of said non-metallic frame extending through said opening locking said tongue portion in said slot and holding said cover portion in coacting relationship with the front surface of said endpiece.

5. In eyeglass construction, in combination, an eyeglass frame formed from material plastic in character, a curved endpiece formed on said frame, an elongated flat member embedded in said endpiece in substantially a horizontal plane with respect to the frame when worn, a cover member secured to and extending therefrom in a plane substantially vertical to the plane in which said elongated flat metallic member lies, one surface of said cover member contacting the outer surface of said curved endpiece, said members having an opening formed therebetween, said opening extending substantially throughout the length of said elongated flat metallic member and having said plastic material extending therethrough, and a temple connected to said elongated flat member.

6. In eyeglass construction, in combination, an eyeglass frame formed from material plastic in character, a curved endpiece, a flat metallic member embedded in said endpiece having an opening formed therein, a cover member secured to said flat metallic member, said cover member lying in a plane substantially vertical with respect to the plane in which said flat metallic member lies and contacting the front surface of said curved endpiece, said plastic material extending through said opening and securing said members to said frame, and a temple hingedly secured to one of said members.

7. In eyeglass construction, in combination, a non-metallic eyeglass frame, an endpiece formed on said frame, a slot formed in said endpiece in substantially a horizontal plane with respect to the normal position of the frame when worn, a metallic fitting including tongue and cover portions, said cover portion being substantially vertical to the plane in which said tongue portion is positioned and following the front surface of said endpiece, said tongue portion being positioned in said slot and having an opening of substantial size extending vertically therethrough, an insert of non-metallic material positioned in said opening, means securing said insert to the side walls of said slot, and a temple hingedly connected to said metallic fitting.

8. In eyeglass construction, in combination, a non-metallic eyeglass frame, a rearwardly curved endpiece formed on said frame, a slot formed in said endpiece in substantially a horizontal plane with respect to the normal position of the frame when worn, a metallic fitting including tongue and cover portions, said cover portion being substantially vertical to the plane in which said tongue portion is positioned and following the front surface of said curved endpiece, said tongue portion being positioned in said slot, means forming an opening between said cover portion and said tongue portion, an insert of non-metallic material positioned in said opening, and means securing said non-metallic material to the side walls of said slot, whereby said insert secures said fitting in said slot and holds said cover portion in coacting relationship with the front surface of said endpiece.

9. In eyeglass construction, in combination, an eyeglass frame formed from material plastic in character, an elongated flat metallic member embedded in said frame having an opening of substantial size therein, said plastic material extending through said opening and securing said flat metallic member to said frame, a cover member secured to the front edge of said metallic member and extending in a plane substantially vertical to the plane of said metallic member, said cover member being positioned externally of said non-metallic frame and contacting its front surface.

AXEL PERSON.